(12) United States Patent
Saxena et al.

(10) Patent No.: US 10,605,470 B1
(45) Date of Patent: Mar. 31, 2020

(54) CONTROLLING CONNECTED DEVICES USING AN OPTIMIZATION FUNCTION

(71) Applicant: BrainofT Inc., Redwood City, CA (US)

(72) Inventors: Ashutosh Saxena, Redwood City, CA (US); Chenxia Wu, Menlo Park, CA (US); Ozan Sener, Palo Alto, CA (US); Brendan Berman, Redwood City, CA (US); Deng Deng, Mountain View, CA (US); Lukas Kroc, Redwood City, CA (US)

(73) Assignee: BRAINOFT INC., Redwood City, CA (US)

( * ) Notice: Subject to any disclaimer, the term of this patent is extended or adjusted under 35 U.S.C. 154(b) by 425 days.

(21) Appl. No.: 15/064,494

(22) Filed: Mar. 8, 2016

(51) Int. Cl.
| | |
|---|---|
| *F24F 11/00* | (2018.01) |
| *H04L 12/24* | (2006.01) |
| *H04L 29/08* | (2006.01) |
| *G06N 7/00* | (2006.01) |
| *G06N 5/02* | (2006.01) |
| *G06N 20/00* | (2019.01) |
| *G06K 9/00* | (2006.01) |
| *G06N 3/00* | (2006.01) |

(52) U.S. Cl.
CPC .............. *F24F 11/00* (2013.01); *G06N 5/025* (2013.01); *G06N 7/005* (2013.01); *G06N 20/00* (2019.01); *H04L 41/0823* (2013.01); *H04L 67/12* (2013.01); *G06K 9/00* (2013.01); *G06N 3/00* (2013.01)

(58) Field of Classification Search
CPC ..... H04L 41/0823; H04L 67/12; G06N 5/025; G06N 7/005; G06N 99/005
See application file for complete search history.

(56) References Cited

U.S. PATENT DOCUMENTS

| | | |
|---|---|---|
| 5,572,627 A | 11/1996 | Brown |
| 8,996,429 B1 | 3/2015 | Francis, Jr. et al. |
| 9,431,021 B1 | 8/2016 | Scalise |
| (Continued) | | |

FOREIGN PATENT DOCUMENTS

| | | |
|---|---|---|
| CN | 1209724 | 7/2005 |
| CN | 103327080 | 9/2013 |
| (Continued) | | |

OTHER PUBLICATIONS

Koppula et al., Anticipatory Planning for Human-Robot Teams, 14th International Symposium on Experimental Robotics (ISER), Jun. 2014.

*Primary Examiner* — Ajay Ojha
(74) *Attorney, Agent, or Firm* — Shun Yao; Park, Vaughan, Fleming & Dowler LLP

(57) ABSTRACT

A network connected controllable device is automatically controlled. A plurality of inputs that indicate states of a network connected device environment associated with a property of the network connected controllable device to be automatically controlled is received. A plurality of output candidates is evaluated according to an optimization function. The optimization function depends on the plurality of inputs and one or more parameters and the output candidates are associated with candidate settings of the property of the network connected controllable device to be automatically controlled. An output that optimizes the optimization function is selected among the plurality of output candidates.

23 Claims, 9 Drawing Sheets

(56) References Cited

U.S. PATENT DOCUMENTS

| | | |
|---|---|---|
| 9,734,839 B1 | 8/2017 | Adams |
| 9,904,709 B2 | 2/2018 | Krumm |
| 9,921,559 B2 | 3/2018 | Tsubota |
| 2001/0021900 A1 | 9/2001 | Kassmann |
| 2007/0006098 A1 | 1/2007 | Krumm |
| 2008/0114564 A1 | 5/2008 | Ihara |
| 2010/0131446 A1 | 5/2010 | Firminger |
| 2011/0125503 A1 | 5/2011 | Dong |
| 2011/0225155 A1 | 9/2011 | Roulland |
| 2012/0163603 A1 | 6/2012 | Abe |
| 2012/0304007 A1 | 11/2012 | Hanks |
| 2013/0073293 A1 | 3/2013 | Jang |
| 2013/0151543 A1 | 6/2013 | Fan |
| 2014/0039888 A1 | 2/2014 | Taubman |
| 2015/0019714 A1 | 1/2015 | Shaashua |
| 2015/0025890 A1 | 1/2015 | Jagatheesan |
| 2015/0142704 A1 | 5/2015 | London |
| 2015/0148919 A1 | 5/2015 | Watson |
| 2015/0242415 A1 | 8/2015 | Martini |
| 2015/0351145 A1 | 12/2015 | Burks |
| 2016/0004501 A1 | 1/2016 | Kar |
| 2016/0072891 A1 | 3/2016 | Joshi et al. |
| 2016/0147506 A1 | 5/2016 | Britt |
| 2016/0210680 A1* | 7/2016 | Pulliam ................ G06Q 10/04 |
| 2016/0217674 A1 | 7/2016 | Stewart |
| 2016/0248847 A1 | 8/2016 | Saxena |
| 2016/0358065 A1* | 12/2016 | Gedge .................... G06N 3/006 |
| 2016/0364617 A1* | 12/2016 | Silberschatz ...... G06K 9/00771 |
| 2017/0099353 A1 | 4/2017 | Arora |
| 2017/0234562 A1* | 8/2017 | Ribbich ............... F24F 2110/10 |
| | | 700/277 |
| 2017/0278514 A1 | 9/2017 | Mathias |
| 2017/0364817 A1 | 12/2017 | Raykov |
| 2018/0288159 A1* | 10/2018 | Moustafa ................ H04W 4/70 |

FOREIGN PATENT DOCUMENTS

| | | |
|---|---|---|
| CN | 103825920 | 5/2014 |
| EP | 2328131 | 6/2011 |
| WO | WO-2014130568 | 8/2014 |
| WO | 2017045025 A1 | 3/2017 |

\* cited by examiner

US 10,605,470 B1

CONTROLLING CONNECTED DEVICES USING AN OPTIMIZATION FUNCTION

BACKGROUND OF THE INVENTION

Network connected devices (e.g., Internet of Things (i.e., IoT) devices) allow remote control and automation of the devices within an environment (e.g., home). However, these devices are often not capable of being fully autonomous. Often users must manually operate the devices in a remote control fashion, or users manually create rules that try to mimic autonomous operations. As user preferences change and multiple users inhabit the same environment, it becomes increasingly difficult to manually maintain the optimal set of rules. Additionally, different automation rules may conflict one another and must be effectively resolved. Therefore there exists a need for a way to automate functionality of network connected devices in a dynamic and efficient manner.

BRIEF DESCRIPTION OF THE DRAWINGS

Various embodiments of the invention are disclosed in the following detailed description and the accompanying drawings.

DETAILED DESCRIPTION

Figure 1A:
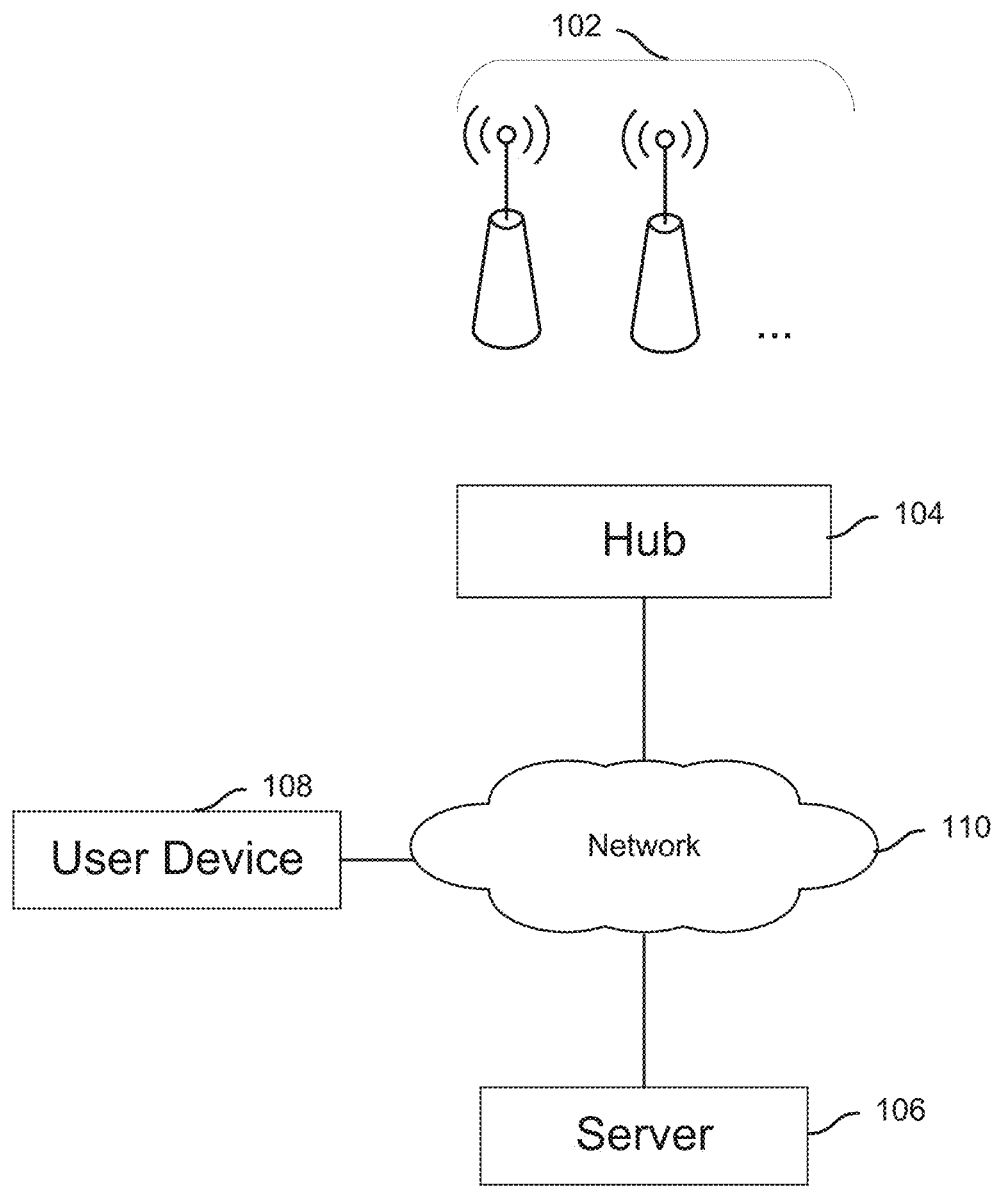
FIG. 1A is a diagram illustrating an embodiment of a system for automatically controlling network devices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Controlling network connected devices is disclosed. In some embodiments, a plurality of inputs that indicate the states of associated inputs is received. For example, detected states of subjects (e.g., user location, user action, etc.), sensors (e.g., motion sensor, chemical sensor, switch position, images, videos, humidity, etc.), selected scene modes (e.g., movie viewing mode, sleeping mode, etc.), user interaction (e.g., via texts, smartphone or tablet app or voice) and ambient/temporal environments (e.g., weather, temperature, humidity, time, day of week, sunlight level, etc.) are received. A plurality of output candidates is evaluated according to an optimization function. The optimization function depends on the plurality of inputs and one or more parameters. For example, an output is a configuration setting of a property of a controllable network connected device (e.g., light output intensity of a network connected light bulb, roller shades, curtains, switches, thermostat, etc.) and for each candidate output corresponding to a different property setting, an optimization evaluation value (e.g., cost value) that summarizes the desirability of the candidate output based on the received inputs is determined. The one or more parameters may have been selected to be utilized due to their association with the one or more of the inputs and may be utilized to determine one or more component values of the optimization value. A selected output that optimizes the optimization function is determined. For example, the optimization function is a cost function and an output that corresponds to the minimal cost value among the output candidates is selected to be utilized to control a property of a network connected device.

In some embodiments, inputs include a series of streaming data in time and selected output includes a streaming series of outputs in time. The optimization function (e.g., based on machine learning) may evaluate this time series data instead of only evaluating an input at a particular instant of time. For example, the best output maybe to ramp down the light levels slowly over time and a series of lower light level outputs is determined based a series of streaming input data. In another example, when turning off lights upon a user exiting an apartment, the ordering of lights to turn off may be determined based a stream of historical data (e.g., first turn off bedroom lights and then turn off the door lights at the very end). In some embodiments, the inputs indicate a previous output and the cost of switching outputs too frequently is analyzed, both for device control reasons (e.g., due to equipment damage from frequent changes) and for user comfort (e.g., avoid flickering lights on and off fast). In some embodiments, the optimization function evaluates the costs of taking an action vs. not taking an action. For example, the selected output action is not to take any action (e.g., maintain current setting of a property of the device). The optimization function may include components that evaluate different cost components (e.g., evaluate the cost of taking an action vs. not taking an action, the probabilities of different scenarios, the state of the person mind/activity, user specified/specific preferences, etc.).

FIG. 1A is a diagram illustrating an embodiment of a system for automatically controlling network devices. Devices 102 includes one or more network connected devices including sensor devices and controllable devices (e.g., IoT devices). Examples of one or more controllable devices included in devices 102 include a switch, a door lock, a thermostat, a light bulb, a kitchen/home appliance, a camera, a speaker, a garage door opener, a window treatment (e.g., roller shades, curtains, etc.), a fan, an electrical outlet, an audio/visual device, a light dimmer, an irrigation system, a pet feeder, and any other device able to be connected to a computer network. Examples of one or more sensor devices included in devices 102 include a switch, a camera, a motion detector, a light detector, an accelerometer, an infrared detector, a thermometer, an air quality sensor, a smoke detector, a microphone, a humidity detector, a door sensor, a window sensor, a water detector, a glass breakage detector, a power utilization sensor, and any other sensor.

Hub 104 communicates with devices 102 via a wired and/or wireless connection. For example, a device of devices 102 communicates with hub 104 via a WiFi, Bluetooth, Bluetooth Low Energy, Zigbee, Z-Wave, power-line communication, Ethernet, and/or any other wireless or wired communication protocol. In some embodiments, hub 104 and devices 102 have been deployed in the same environment. For example, devices 102 includes devices that have been deployed in a home and hub 104 wirelessly communicates with the devices within the home via a short range wireless signal. In some embodiments, hub 104 facilitates communication and/or control of devices 102 with user device 108 and/or via network 110. For example, user device 108 connects to hub 104 via a direct wireless connection (e.g., Bluetooth, Wifi, etc.) and/or via network 110 to control and view information about a device of devices 102. In another example, user device 108 connects to network 110 to access devices 102 via hub 104 and/or server 106. In some embodiments, one or more devices/sensors of devices 102 report information to hub 104 that in turn provides the reported information to server 106 via network 110 for processing. In some embodiments, one or more devices and/or sensors of devices 102 directly communicate with network 110 without being routed via hub 104. For example, a device includes a Wifi and/or cellular radio to directly access network 110.

Examples of user device 108 include a laptop computer, a smartphone, a tablet computer, a desktop computer, a wearable device, a smartwatch, and any other electronic computing device of a user. In some embodiments, information from user device 108 is provided to server 106 and/or hub 104 to enable automation of devices 102. For example, a GPS location detected by user device 108 is provided to hub 104 and/or server 106 as a sensor input to determine and/or trigger device automation rules. In some embodiments, information associated with a device of devices 102 is provided to user device 108. For example, a detected alert of a device of devices 102 is provided to user device 108 via hub 104 and/or server 106. Server 106 may be a part of a cloud computing infrastructure to process and/or store information associated with devices 102 to enable control and management of devices 102. In some embodiments, hub 104 functions as an interface and a control hub to automatically control devices 102. Although storage elements have not been explicitly shown in FIG. 1A, any of the shown components may include a local storage and/or access a locally connected and/or remote storage.

In some embodiments, using the system shown in FIG. 1A, machine learning is performed to automatically learn how users want to interact with one or more controllable devices of devices 102 to autonomously and automatically adjust properties of the controllable devices. In some embodiments, powerful statistical models of user preferences and behaviors are automatically built. For example, sensors of devices 102 and user device 108 are utilized to learn about a user's presence, activities, and behavioral preferences. Controllable devices of devices 102 may be automatically managed and controlled based on the learned data.

In some embodiments, machine learning (e.g., local and/or cloud-based) is utilized to integrate input from many different devices/sensors (e.g., devices 102) to build a unique model of a user's presence, activities, and behavior. For example, an environment such as home is installed with devices 102 that can be controlled remotely or locally. The sensors of devices 102 may provide data about the presence and motion of people in an environment, measurements of the environmental properties such as light, temperature and humidity of the house, motion of subjects, and video of different locations of the environment. In some embodiments, learning is performed to learn how to automatically control the controllable devices and automatically adjust the controllable devices of devices 102 to match the automatically determined preferences of the users. For example, sensors detect the environmental conditions that trigger changes in the controllable device states (e.g., behavior and interaction with switches, thermostats, and other devices), and devices of devices 102 are commanded autonomously in accordance with automatically learned preferences of the users.

In some embodiments, machine learning is performed for a particular environment by a local hub. For example, hub 104 performs learning for the users of its deployed environment including devices 102. In some embodiments, rather than performing machine learning at a local hub, at least a portion of the machine learning is performed remotely (e.g., cloud-based). For example, machine learning for the environment of hub 104 is performed by server 106. In some embodiments, a backend server performs learning across various different environments and utilizes the result to aid in automatically configuring each local environment.

In some embodiments, hub 104 and/or server 106 includes one or more inference engines that convert sensor data received from one or more devices of devices 102 into state representations (e.g., state of a person's behavior, location, etc.). For example, the inference engine utilizes machine learning algorithms that rely on statistical and/or deep learning techniques. In some embodiments, hub 104 and/or server 106 includes a "vision engine" (e.g., ML Inference) that receives images/video from one or more camera sensors and analyzes the images/video using vision algorithms to infer a subject's (e.g., human, pet, etc.) location, behavior, and activities (e.g., spatial and motion features). In some embodiments, camera video data is analyzed to learn hand gestures of a person that control connected devices to a desired state. In one embodiment, the gestures are learned from statistical demonstrations by the person. In one embodiment, the gestures are learned using deep learning. In some embodiments, output of vision data and the data from other sensor devices are utilized to build a semantic representation containing information about a person's presence, activities, and behavioral preferences.

In some embodiments, in the system shown, the data is sent using an event-driven database architecture. For example, the sensor data is first converted into a compact feature vector before streaming. In some embodiments, the sensor data is cleaned, before streaming, by statistical learning models that model the different types of noise in the system.

In some embodiments, hub 104 and/or server 106 includes one or more "rule engines" that utilize a detected state to trigger one or more automatically determined automation rules. For example, the rule engine consists of rules with pre-conditions and post-conditions and if a certain pre-condition state of the environment is detected, a rule is triggered to cause one or more network connected controllable devices to be placed in the post-condition state. For example, if it is detected that a person is reading a book on a desk, then the system will turn on reading lights.

In some embodiments, server 106 stores various types of information that can be utilized to automatically determine automation rules. For example, sensor data at various points in time as well as device control events of devices 102 (e.g., pressing a light switch, changing a temperature of a thermostat, etc.) are logged. By learning the preferences/configurations desired by users, the preferences/configurations may be recreated when the conditions in the environment match the previously recorded conditions. In some embodiments, statistical models (e.g., transition model) of the control action of devices are determined. For example, when a network connected light bulb is turned on or off, the associated environmental conditions (e.g., user location, action, time of day, etc.) and associated controllable device status are stored. In some embodiments, which state vector maps to which control action of controllable devices is learned. In some embodiments, a learning method learns the weight of a function that maps the value of the state vector to the state change of controllable devices. In some embodiments, a learning method uses deep learning in order to learn a multi-staged non-linear mapping from the state vector to the state changes of controllable devices. In some embodiments, feedback from the user regarding an action of an automatically triggered rule is received in the form of a reward, and reinforcement learning is used to automatically modify the control rule.

In some embodiments, certain alarming or important events are detected and the data is stored. For example, a break-in is detected as an unusual event, and in response, output alerts are generated including an alert that is sent to a smartphone and activation of a siren. In another example, a baby climbing out of a crib is detected. Unlike manually set alarms, the automatically detected unusual events may be detected based on statistical modeling of events using sensor data.

In some embodiments, in response to detecting an event, an output response (e.g., sound, user alert, light alert, wearable alert, etc.) is generated. For example, when it is detected that a stove is left on beyond a threshold amount of time and/or when no human subject is detected as present, the stove is automatically turned off and/or an output alert is generated. In another example when a water leak is detected, an automatic output alert is sent and a water valve is automatically turned off. In another example, when it is detected a person has fallen and further movement of the person is not detected, an alert to an emergency contact person and/or an emergency authority is automatically sent. In another example, if a presence of a person is detected in a living room during morning times, curtains are automatically opened. In another example, if it is detected that humidity is above a threshold value, a fan is automatically turned on. In another example, a humidifier is automatically switched on/off to maintain a preferred humidity. In another example, when a learned preferred time is reached, a coffee maker is automatically turned on. In another example, a dishwasher is automatically scheduled to be operated at a time when energy rates are relatively lower. In another example, light intensity is automatically adjusted based on a time of day (e.g., lights turned on a lower intensity when a subject wakes up in the middle of the night to use the bathroom.). In another example, music is automatically turned on when it is detected that a subject is eating dinner. In another example, when it is detected that ambient temperature and humidity are above threshold values and a subject is detected as sitting, a fan is automatically turned on.

One or more of the following may be included in network 110: a direct or indirect physical communication connection, mobile communication network, Internet, intranet, Local Area Network, Wide Area Network, Storage Area Network, a wireless network, a cellular network, and any other form of connecting two or more systems, components, or storage devices together. Additional instances of any of the components shown in FIG. 1A may exist. For example, multiple hubs may be deployed and utilized in a single environment. Multiple user devices may also be utilized to receive user associated information and/or control devices of the same environment. Server 106 may be one of a plurality of distributed servers that process network connected device data. In some embodiments, components not shown in FIG. 1A may also exist.

Figure 1B:
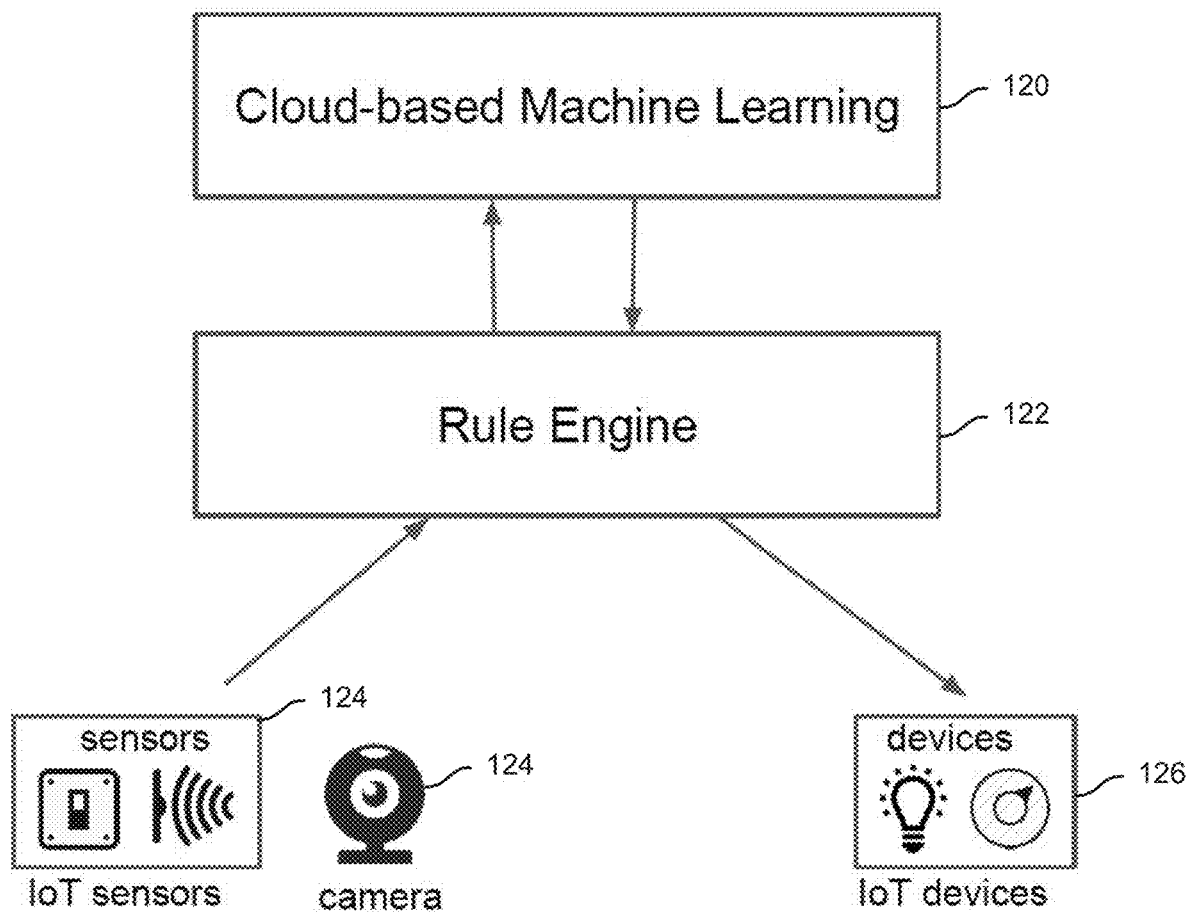
FIG. 1B is a diagram illustrating an embodiment of interactions between components for automatically controlling network devices.

FIG. 1B is a diagram illustrating an embodiment of interactions between components for automatically controlling network devices. Cloud-based machine learning module 120 communicates with rules engine 122. Rules engine 122 receives input from sensors 124 and controls devices 126. Examples of cloud-based machine learning module 120 include one or more modules for performing machine learning discussed in conjunction with FIG. 1A. Examples of rules engine 122 include one or more "rule engines" of hub 104 and/or server 106 of FIG. 1A. Sensors 124 and/or controls devices 126 may be included in devices 102 of FIG. 1A.

Figure 1C:
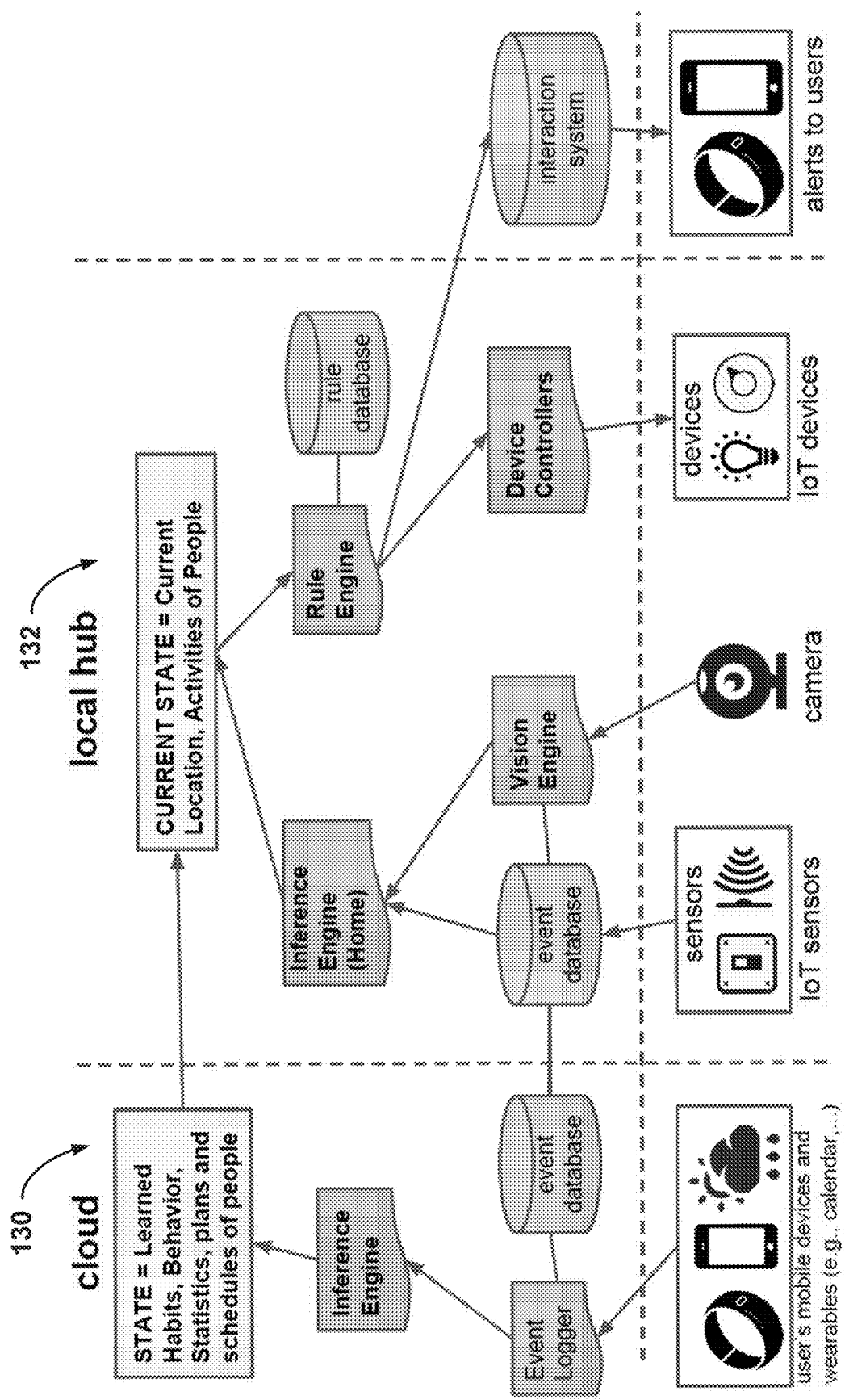
FIG. 1C is a diagram illustrating an embodiment of sub components of a system for automatically controlling network devices.

FIG. 1C is a diagram illustrating an embodiment of sub components of a system for automatically controlling network devices. In some embodiments, components 130 of the cloud shown in FIG. 1C may be included in server 106 of FIG. 1A. In some embodiments, components 132 of the local hub shown in FIG. 1C may be included in hub 104 of FIG. 1A.

Figure 2:
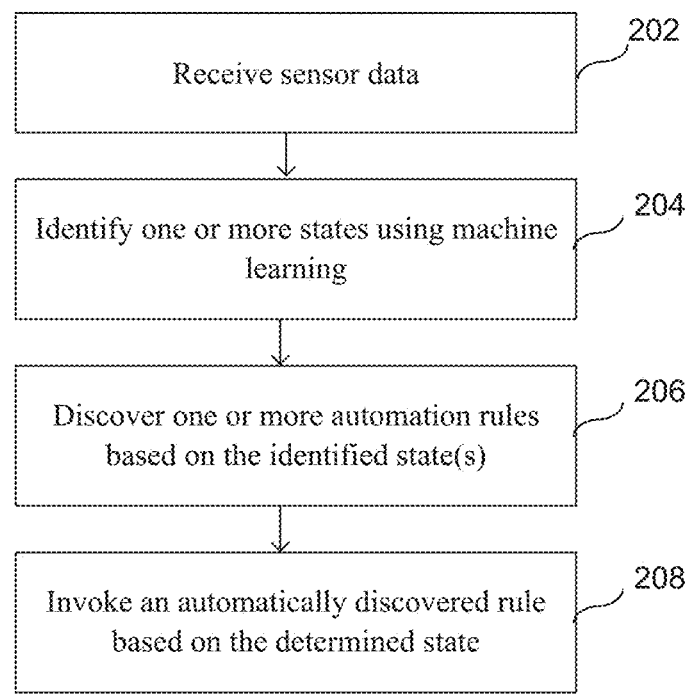
FIG. 2 is a flowchart illustrating an embodiment of a process for automatically learning and applying device control rules.

FIG. 2 is a flowchart illustrating an embodiment of a process for automatically learning and applying device control rules. The process of FIG. 2 may be at least in part performed by hub 104 and/or server 106 of FIG. 1A.

At 202, sensor data is received. In some embodiments, the received sensor data includes data from one or more sensor devices of devices 102 of FIG. 1A. For example, data from a switch, a camera, a motion detector, a light detector, an accelerometer, an infrared detector, a thermometer, an air quality sensor, a smoke detector, a microphone, a humidity detector, a door sensor, a window sensor, a water detector, a glass breakage detector, and any other sensor monitoring an environment is received. In some embodiments, the sensor data includes data from a user device (e.g., user device 108 of FIG. 1A). For example, data from a sensor on the user device (e.g., location sensor, GPS, accelerometer, heart rate sensor, orientation sensor, microphone, gyroscope, etc.) is received. In another example, the data from the user device includes status data and/or user specified data. In some embodiments, the sensor data includes data from one or more controllable devices. For example, a status, a configuration, a functional state, a parameter, and/or any other data of a controllable device of devices 102 of FIG. 1A is received. In some embodiments, the sensor data is received periodically. For example, a sensor device sends currently detected sensor data periodically. In some embodiments, the sensor data is received dynamically. For example, the sensor data is received when sensor data has been detected. In some embodiments, the received sensor data is received from a plurality of sensor devices. In some embodiments, the sensor data is received at a hub (e.g., hub 104 of FIG. 1A) and the sensor data is shared/sent to another hub and/or sent to the computing cloud for processing (e.g., sent to server 106 of FIG. 1A).

At 204, one or more states are identified using machine learning. In some embodiments, machine learning is performed using the received sensor data. In some embodiments, performing machine learning includes utilizing a recursive hidden Markov model and/or expectation maximization. In some embodiments, each state is associated with discrete categories of information desired to be detected using machine learning. For example, an activity currently being performed by a person is desired to be detected among a plurality of possible activities able to be detected. This may be achieved by analyzing camera video/image data to detect a person and activity performed by the person. In some embodiments, a state for each detected subject is determined. In some embodiments, by reducing the sensor data to one or more specific states, the sensor data is reduced to meaningful variable values that can be utilized to determine one or more automation rules. In some embodiments, the state may be in a form of a vector. For example, the state vector includes a grouping of values. In some embodiments, the state vector includes one or more of the following: a time value, a weather forecast, a date value, and other data associated with time and/or environment conditions.

In many cases, it is difficult to determine a specific state with complete accuracy. For example, using the sensor data, it may be difficult to determine the exact location and activity of a subject. In some embodiments, a likelihood/probability that the determined state is correct is determined. For example, a certain state may be one of a plurality of different possible states and the probability that each possible state is the correct state is determined. In some embodiments, in order to determine the probability, machine learning (e.g., statistical and/or deep learning) may be performed. For example, statistical and/or deep learning models of correlations between sensor data and a potential state, a previous state and the potential state (e.g., transition model), and associations between different states/state components are built and utilized to determine an overall likelihood/percentage for each candidate state.

In some embodiments, the observations in time are utilized as statistical inputs and utilized to estimate a state vector evolving in time. The state vector may be the output of an inference engine that converts the sensor data into information about a detected subject presence, activities, etc.

In one embodiment, the dynamic processes of the subjects in the house (e.g., human and pet) and their motions are modeled. In one embodiment, deep learning is utilized to learn non-linear relations. In some embodiments, sounds captured from microphone sensors are utilized to infer the number of people, their location, and their activities. In one embodiment, statistical models are utilized to relate sound to the aforementioned state vector.

In some embodiments, a state vector including the activity state (e.g., general activity state—reading, sleeping, cooking, etc. and detailed activity state—reading-opening-book, placing-book-down, etc.) of a subject is estimated. In one embodiment, the state vector includes other relevant information such as time-of-the-day, weather, number of people in the house, subject locations, and current activities being performed. In some embodiments, the state vector includes one or more controllable device states. In some embodiments, the state vector includes a listing of subjects with each region (e.g., room) of an environment. In some embodiments, a learning method learns the weight of a function that maps the values of the sensor data to the state vector. In some embodiments, a learning method utilizes deep learning to learn a multi-staged non-linear mapping from the sensor data to the state vector.

In some embodiments, data from the sensors and/or cameras is analyzed in order to predict what activities the person may perform or locations the person may go to. Based on the activity and/or location prediction, anticipatory actions may be taken. For example, if a user starts moving towards a reading desk, it is predicted that the user will go to the reading desk to read and a network connected light will turn on even before the user starts reading.

At 206, one or more automation rules are discovered based on the identified state(s). For example, once it has been observed that an identified state is correlated with a certain controllable device state/status/action, a rule that places the controllable device into the associated state/status/action when the associated state is detected is created. Correlation between a determined state and a detected controllable device state/status/action may be identified and once the correlation reaches a threshold, an automation rule is dynamically created and/or updated. In some embodiments, a correlation between a group of states and/or a range of state values with a controllable device state/status/action is identified and utilized to generate an automation rule. In some embodiments, the probability measure of each state may be utilized when determining the correlations and/or automation rules. In some embodiments, a history of determined states and associated probability values and co-occurring controllable device states/status/actions over time are stored and analyzed using machine learning (e.g., statistical and/or deep learning) to discover correlations. In the event a measure of correlation is above a threshold value, a corresponding automation rule may be created/updated. In some embodiments, automation rules are continually added/updated based on new correlations that are discovered.

In some embodiments, the rules in the rule engine that control the devices are automatically learned. In one embodiment, the rules are formulated as a reinforcement learning problem in order to learn the policy. In one embodiment, the execution of the policy is performed using proportional-derivative controllers. The rule engine may take actions (e.g., changing the state of the devices) based on triggering state vector and sensor information. In one embodiment, parameters of a machine learning algorithm are modified using online stochastic gradient algorithms. The rule engine may take into account data from a user device, web services, weather services, calendar events, and other data sources to learn and/or trigger rules.

At 208, an automatically discovered rule is invoked based on the determined state. For example, a triggering condition of the automatically discovered rule is the identified state, and the rule is invoked to modify a property (e.g., state/status/function/action, etc.) of a controllable device to be as specified by the rule. In some embodiments, the triggering condition of the rule is a plurality of different states and/or a range of states. In some embodiments, a plurality of rules is applied/triggered based on the determined state. In some embodiments, the applied rule is inconsistent with another rule to be applied. For example, one rule specifies that a light switch should be turned on while another rule specifies that the light switch should be turned off. In order to resolve conflicts between rules, each rule may be associated with a preference value that indicates a measure of preference of the rule over another rule. In some embodiments, feedback from the user regarding an action of an automatically triggered rule is received in the form of a reward, and reinforcement learning is used to automatically modify the control rule.

In some embodiments, an optimization function is utilized to modify a property of a controllable device. For example, at each periodic interval, state inputs are received (e.g., user states, device/sensor states, environmental states, states of 204, etc.) and utilized to select the optimal property setting of the controllable device given the state inputs. This includes utilizing an optimization function (e.g., cost function) to evaluate optimization evaluation values (e.g., learned or specified cost values) of candidate property settings of the controllable device to select and implement the optimal candidate property setting. One or more components of the optimization evaluation values may vary according to one or more dynamic parameters.

Figure 3:
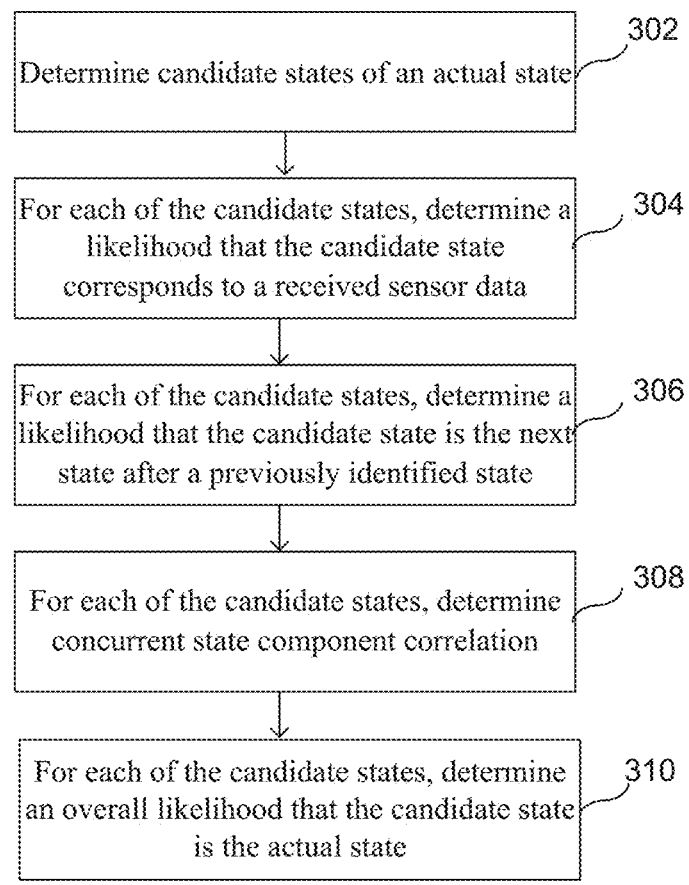
FIG. 3 is a flowchart illustrating an embodiment of a process for determining a likelihood that a detected state is the correct state.

FIG. 3 is a flowchart illustrating an embodiment of a process for determining a likelihood that a detected state is the correct state. The process of FIG. 3 may be at least in part implemented on hub 104 and/or server 106 of FIG. 1A. In some embodiments, the process of FIG. 3 is included in 204 of FIG. 2. In some embodiments, the process of FIG. 3 is performed periodically. In some embodiments, the process of FIG. 3 is performed dynamically. For example, the process of FIG. 3 is performed when new sensor data is received.

At 302, candidate states of an actual state are determined. For example, candidate states that may correspond to a newly received sensor data are identified. In some embodiments, the candidate states are possible states of an actual current state of a subject (e.g., human, animal, pet, robot, other living or non-living object, etc.). For example, because the exact current state (e.g., location and activity currently being performed) of a subject may be difficult to determine from sensor data with complete accuracy, candidates states (e.g., each candidate state including a location component and an activity component) for a subject are identified.

In some embodiments, determining the candidate states includes identifying all possible states that can be associated with the received sensor data. For example, all possible predefined activities of a subject that can be identified using data from a camera are identified. In some embodiments, determining the candidate states includes identifying the most likely candidate states. For example, rather than identifying all possible states, the most likely candidate states are identified. In some embodiments, the most likely candidate states are identified by analyzing associated sensor data received in 202 of FIG. 2. In some embodiments, determining the candidate states includes identifying a subject associated with newly received sensor data and identifying the last determined state for the subject. In some embodiments, the most likely candidate states are identified based on a previous current state. For example, for a given previous state (e.g., a location of a subject), only certain states are eligible to become the new current state (e.g., only locations adjoining the previous location) and these states are identified.

In some embodiments, a single state includes a plurality of sub states. In some embodiments, each state includes an identifier of a subject, a coarse location of the subject (e.g., which room of a house/building), a specific location of the subject within the coarse location (e.g., on the bed of a bedroom), whether the subject is present within an environment, a type of the subject (e.g., human vs. pet, specific individual, etc.), a coarse activity of the subject (e.g., reading), and the specific activity of a subject (e.g., opening a book). In some embodiments, each candidate state includes a state of a controllable object. In some embodiments, an activity state of a subject is one of predefined activities that can be detected (e.g., detected based on observed/training data).

At 304, for each of the candidate states, a likelihood that the candidate state corresponds to a received sensor data is determined. For example, a probability that a received sensor data corresponds to a particular candidate state is determined. In some embodiments, the likelihood identifies a probability that the candidate state is the actual state given the sensor data. In some embodiments, this likelihood is determined using machine learning. For example, statistical and/or deep learning processing has been utilized to analyze a training data set of example associations between different sensor data and corresponding states to determine associated probabilities of association between different sensor data and different states. In some embodiments, the likelihood that the candidate state corresponds to the received sensor data is determined using a predetermined analysis algorithm. For example, a computer vision pattern recognition algorithm is utilized to analyze camera sensor data and the algorithm provides the likelihood.

At 306, for each of the candidate states, a likelihood that the candidate state is the next state after a previously identified state is determined. For example, a probability that the candidate state is the actual state after a previously determined state of a subject is determined. In some embodiments, this likelihood is determined using machine learning. For example, statistical and/or deep learning processing has been utilized to analyze observed state transitions between different states to determine a transition model of probabilities for each potential candidate state given a previous state. In one example, a motion detector sensor has been installed in each room of a house. The relative locations of the rooms of the house may be automatically determined by using machine learning to observe the pattern of sensor triggers as subjects move from one room to another room. Once the connections between the rooms are known, given a current room location of a subject, the possible adjoining rooms are known and each likelihood that the subject will visit a next room of the possible connected rooms may be determined. For example, given the previous state that indicates a location of a subject, the next state is limited to adjoining rooms that are reachable given the determined/observed rate of movement of the subject and elapsed time between the sensor data of the states.

At 308, for each of the candidate states, a concurrent state component correlation is determined. For example, certain candidate state components are more likely included together in the correct state than another grouping of candidate state components. In some embodiments, determining the concurrent state correlation includes determining a probability that one component of the candidate state is included in the correct/actual state given another component of the candidate state. For example, a candidate state includes a location state component and an activity state component, and the probability of the specific activity state component given the specific location state component is determined. In some embodiments, determining the concurrent state correlation includes determining a plurality of probabilities each associated with a different pair combination of state components of the candidate state.

At 310, for each of the candidate states, an overall likelihood that the candidate state is the actual state is determined. For example, for each candidate state, the overall probability that the candidate state is the correct state of a subject is determined. In some embodiments, determining the overall state includes multiplying together one or more of the probabilities determined in 304, 306, and 308. For example, at least a first probability that the candidate state corresponds to a received sensor data, and a second probability that the candidate state is the next state after a previously identified state are multiplied together to obtain the overall likelihood. In some embodiments, the candidate states are sorted based on their overall likelihoods and the candidate state with the best overall likelihood is selected as the actual/correct state.

Figure 4:
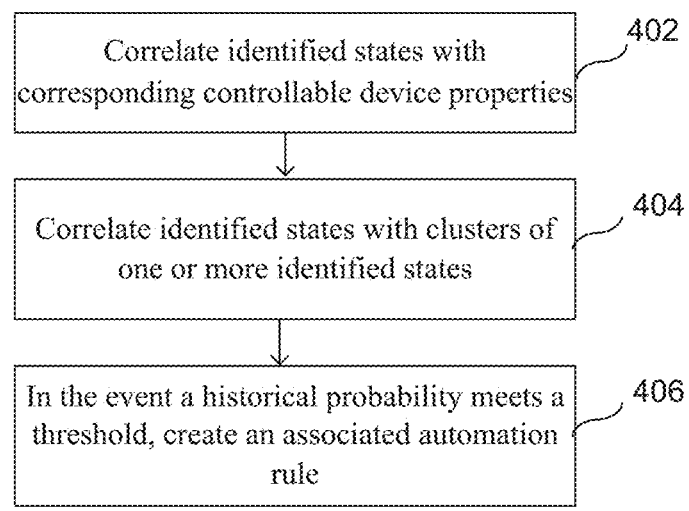
FIG. 4 is a flowchart illustrating an embodiment of a process for automatically discovering an automation rule of a network connected controllable device.

FIG. 4 is a flowchart illustrating an embodiment of a process for automatically discovering an automation rule of a network connected controllable device. The process of FIG. 4 may be at least in part implemented on hub 104 and/or server 106 of FIG. 1A. In some embodiments, the process of FIG. 4 is included in 206 of FIG. 2. In some embodiments, the process of FIG. 4 is performed periodically. In some embodiments, the process of FIG. 4 is performed dynamically. For example, the process of FIG. 4 is performed when a new current state is identified.

At 402, identified states are correlated with corresponding controllable device properties. For example, a state that has been identified as being the actual state of a subject in 310 of FIG. 3 is correlated with a corresponding status, a configuration, a functional state, a property, a parameter, and/or any other data of a controllable device of devices 102 of FIG. 1A. In some embodiments, the identified states are correlated with corresponding controllable device properties by analyzing a stored history of identified states and controllable device properties to identify controllable device properties that correspond with identified states. For example, corresponding pairings between an identified state (e.g., state vector) and a corresponding controllable property (e.g., status, configurations, functional states, parameters, and/or any other data) of a controllable device are determined. In some embodiments, correlating the identified states with corresponding controllable device properties includes performing machine learning to discover correlations. For example, statistical and/or deep learning techniques are utilized to discover temporal correlations between identified states and controllable device properties. In some embodiments, the identified states include state vectors that may include one or more of the following: a time value, a weather forecast, a date value, and other data associated with time and/or environment conditions. In some embodiments, a historical probability that an identified state corresponds to a specific controllable device property is determined.

At 404, identified states are correlated with clusters of one or more identified states. In some embodiments, similar identified states (e.g., state value within a range) are clustered together and correlated with a controllable device state. For example, identified device states that are associated with physical locations that are close in range with one another are clustered together. This cluster of states is correlated together with one or more corresponding controllable device properties. In some embodiments, a cluster probability that a cluster of one or more identified states corresponds to the same controllable device property is determined. The cluster probability may identify a historical probability that any identified state included in the cluster corresponds to the controllable device property. In some embodiments, the cluster probability is determined by at least multiplying together individual probabilities of each identified state (e.g., probability determined in 310 of FIG. 3) of the cluster.

At 406, in the event a historical probability meets a threshold, an associated automation rule is created. For example, if a historical probability determined in 402 and/or a cluster probability determined in 404 is greater than a threshold value (e.g., 80%), a corresponding automation rule is stored in a rule database. In some embodiments, the automation rule identifies that if an identified state (e.g., included in the cluster of identified states) is detected, the corresponding controllable property setting is to be recreated/implemented (e.g., property of corresponding controllable device(s) modified to be the rule specified in controllable device property setting). In some embodiments, the automation rule is updated periodically. For example, the automation rule is associated with an expiration time and the rule is to be renewed or deleted upon expiration. In some embodiments, creating the associated automation rule includes setting or modifying one or more optimization evaluation values identifying a relationship between an identified state and a corresponding controllable device property. For example, a measure of user desirability of the corresponding particular controllable device property setting given the identified state is determined and saved for use when utilizing an optimization function to automatically determine and control the controllable device.

Figure 5:
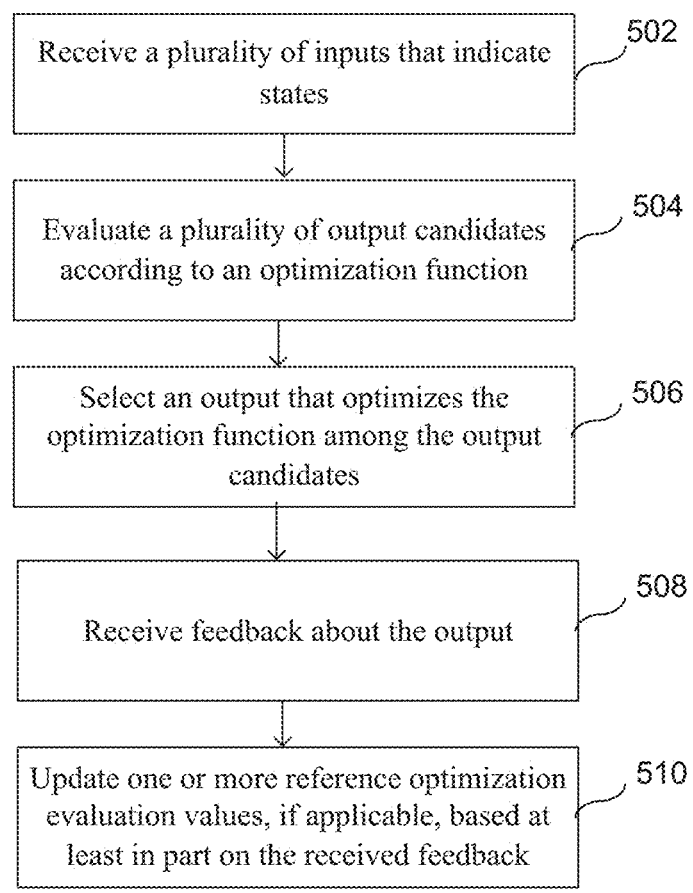
FIG. 5 is a flowchart illustrating an embodiment of a process for determining a selected output result using an optimization function.

FIG. 5 is a flowchart illustrating an embodiment of a process for determining a selected output result using an optimization function. The process of FIG. 5 may be at least in part implemented on hub 104 and/or server 106 of FIG. 1A. In some embodiments, the process of FIG. 5 is included in 208 of FIG. 2. In some embodiments, the process of FIG. 5 is performed periodically. For example, the process of FIG. 5 is repeated at a regular interval of time. In some embodiments, the process of FIG. 5 is performed dynamically. For example, the process of FIG. 5 is performed when a new input or state is identified. In some embodiments, the process of FIG. 5 is repeated for each controllable property of each controllable device to be automatically controlled.

At 502, a plurality of inputs that indicate states is received. For example, each input identifies an associated state of the input. In some embodiments, the received inputs correspond to determining a control setting of a controllable device. For example, the states of the inputs are to be analyzed to determine the control setting. In some embodiments, the received inputs include one or more states identified in 204 of FIG. 2. In some embodiments, the received inputs include one or more states identified using the process of FIG. 3. Each received input may indicate corresponding states of one or more subjects (e.g., user location, user activity, user preference, etc.), devices (e.g., sensor data, controllable device setting, device configuration, etc.), and/ or environments (e.g., time, date, weather, humidity, air quality, geographical location, etc.). In some embodiments, at least one of the plurality of inputs indicates a scene mode. For example, various scene modes (e.g., breakfast scene, sleeping scene, reading scene, movie scene, away mode, etc.) define a desired group of controllable device settings for a particular activity or status of one or more users. The scene mode may be manually specified by a user and/or automatically determined. In some embodiments, at least one of the plurality of inputs indicates a history of states, outputs, settings, and/or configurations. For example, the input identifies one or more previously determined outputs identifying controllable device property settings.

In some embodiments, receiving the inputs includes selecting inputs to be utilized among a larger group of possible inputs. For example, it is determined which inputs are relevant in automatically determining an output control setting for a property of a controllable device. The selection of inputs to be utilized may have been preconfigured (e.g., determined based on a predefined configuration for a particular controllable property of a controllable device). For example, a programmer has manually configured which inputs are to be analyzed when automatically determining a particular output (e.g., control setting of a controllable device). In some embodiments, the selection of inputs to be utilized is based at least in part on an automation rule that was created in 406 of FIG. 4. In some embodiments, the selection of inputs to be utilized is based at least in part on locations of devices associated with the inputs relative to a controllable device. For example, based on a mapping of physical locations of devices/sensors within an installation environment, states of a device that are located in the same room and/or physically near the controllable device to be controlled are automatically selected as inputs. In various embodiments, the selection of inputs to be utilized is automatically determined based on machine learning.

At 504, a plurality of output candidates is evaluated according to an optimization function. For example, a plurality of candidates for a controllable property setting of a controllable device (e.g., candidate settings of a property of the controllable device) is evaluated according to an optimization function. The optimization function depends on the received inputs and one or more parameters of the one or more received inputs. Examples of the optimization function include a cost function, a maximization function, a risk function, a value function, a probability function, a decision function, or any other function that can be utilized to compare the plurality of output candidates. In some embodiments, evaluating the output candidates includes determining a measure of optimization (e.g., optimization evaluation value) for each configuration candidate. For example, for each candidate output, a candidate optimization evaluation value identifying a desirability of the candidate output is determined. By comparing the candidate optimization evaluation values using the optimization function, one of the candidates may be selected as the optimum output.

In some embodiments, evaluating the output candidates includes evaluating, for each output candidate (e.g., for each configuration setting candidate for a controllable property of the controllable device), a measure of desirability of the output candidate for each received input state. For example, the measure of desirability varies for each different output candidate even though the input state is the same. In some embodiments, in order to determine the measure of desirability for a particular output candidate, an input state optimization evaluation value corresponding to the output candidate is determined for each input state and the input state optimization evaluation values for the output candidate are summed to determine the overall measure of desirability for the output candidate (e.g., candidate optimization evaluation value). In some embodiments, rather than only evaluating each individual input state separately for an output candidate, a cluster of input states is evaluated together as a group for a particular output candidate. For example, certain input states are determined to be correlated together and for an output candidate, a component optimization evaluation value is determined for the cluster of input states as a single entity rather than separately for individual input states.

In some embodiments, determining an input state optimization evaluation value for one or more input states includes utilizing one or more parameters to dynamically determine the input state optimization evaluation value. For example, rather than using a predetermined static mapping from the output candidate and input state to an input state optimization evaluation value, the optimization evaluation value may vary according to one or more other variables that are inputs to the parameters. In one example, an optimization evaluation value decays over time from a time of a specified event according to a decay function parameterized by a parameter that utilizes a time value as an input.

In some embodiments, the evaluation of the plurality of output candidates is based at least in part on automatically detected/learned and/or user/programmer specified preferences/rules. For example, which optimization function to utilize and/or values (e.g., optimization evaluation values) that indicate preference/relationships between a particular configuration setting are automatically selected/determined using machine learning and/or preferences/rules (e.g., determined using the process of FIG. 4).

At 506, an output that optimizes the optimization function is selected among the output candidates. In some embodiments, the selected output specifies a selected configuration setting of a property of the controllable device. In some embodiments, selecting the output includes selecting an output candidate based on a comparison of the output candidate optimization evaluation values (e.g., compare optimization evaluation values using the optimization function). For example, a cost value has been determined for each output candidate and a cost minimization function is utilized to select the output candidate with the minimal cost value. In some embodiments, the selected output is provided to the controllable device to implement the selected setting specified by the output, if applicable. For example, the selected output is provided to the controllable device to change its controllable setting if the selected output indicates a setting that is different than a current setting for the controllable device property being automatically controlled.

In various embodiments, by utilizing the optimization function, conflicts between automation correlations/policies/rules are resolved. For example, two or more automation correlations/policies/rules are to be activated because the received input state triggers these automation correlations/policies/rules, but they may specify conflicting controllable device settings that cannot be all implemented at the same time (e.g., one rule specifies an "on" configuration setting while another rule specifies an "off" configuration setting). By comparing various associated optimization values associated with each possible configuration setting, the most optimal configuration setting given the input states may be determined.

At 508, feedback about the output is received. For example, in the event the output result resulted in an undesirable output result (e.g., configuration setting of the controllable device), a user may specifically override the configuration setting by explicitly changing the configuration setting (e.g., adjust control switch of the network connected controllable device). In some embodiments, a user may confirm via a user indication whether a change in output configuration settings was desired. For example, using a user device, a user may specify whether a recent output resulted in an automation behavior desired by the user. In some embodiments, a lack of an action by a user is a confirmation feedback that the output was not undesirable. For example, a relationship between an input state and the selected output is assumed to be more acceptable by a user the longer and/or more often the user has not provided feedback or modified the configuration setting given the same input state.

At 510, one or more reference optimization evaluation values are updated, if applicable, based at least in part on the received feedback. For example, one or more reference values (e.g., evaluation metric values to be referenced for future evaluations) identifying an association between an input state and a particular output (e.g., configuration setting of the controllable device) are updated using the received feedback. For example, a positive indication from a user that the output was desired reduces an associated optimization evaluation value and a negative indication from the user that the output was not desired increases the associated optimization evaluation value.

Figure 6:
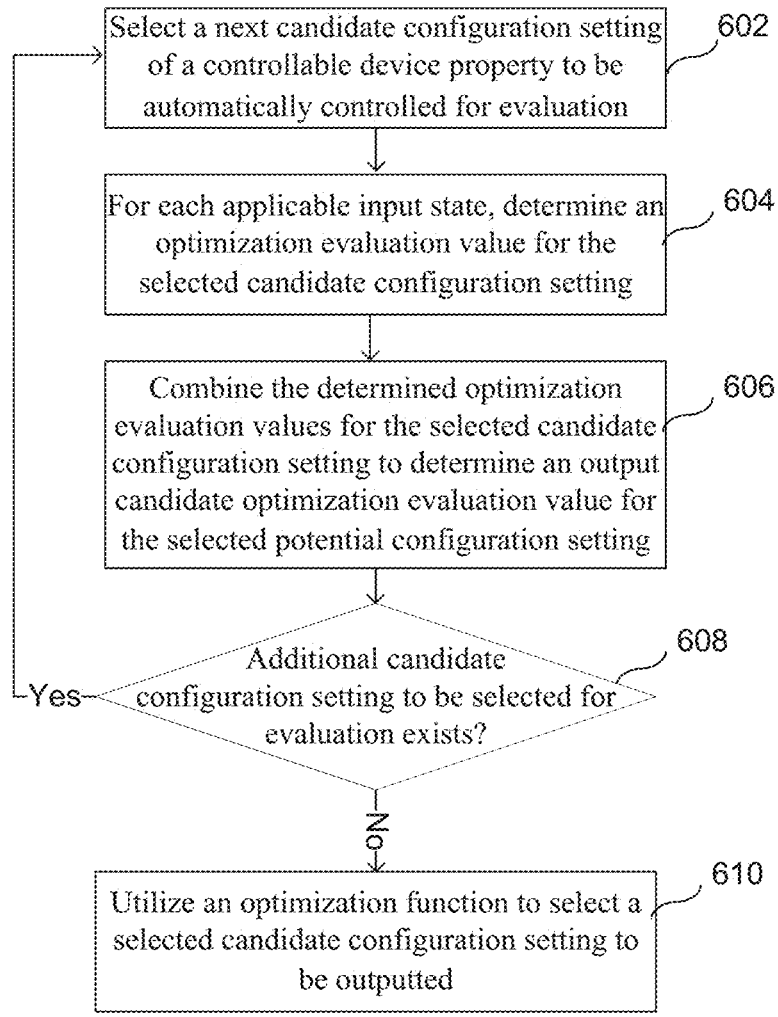
FIG. 6 is a flowchart illustrating an embodiment of a process for automatically determining a configuration setting of a controllable property of a network connected controllable device.

FIG. 6 is a flowchart illustrating an embodiment of a process for automatically determining a configuration setting of a controllable property of a network connected controllable device. The process of FIG. 6 may be at least in part implemented on hub 104 and/or server 106 of FIG. 1A. In some embodiments, at least a portion of the process of FIG. 6 is included in 208 of FIG. 2. In some embodiments, at least a portion of the process of FIG. 6 is included in 504 and/or 506 of FIG. 5.

At 602, a next candidate configuration setting of a controllable device property to be automatically controlled is selected for evaluation. For example, in order to automatically determine the configuration setting of the property of the controllable device, each candidate configuration setting for the property is to be evaluated based on current states (e.g., current states of users, sensors, devices, environment, configuration modes/groupings, etc.) of a network connected device installation environment (e.g., apartment unit) and each candidate configuration setting is selected iteratively for evaluation. In some embodiments, selecting the next candidate configuration setting includes selecting a next item in a list of candidate configuration settings for a property of the controllable networked device. In some embodiments, the list of candidate configuration settings includes all possible configuration settings of the property of the controllable networked device. Examples of the property of the controllable networked device include a switch state, a value setting, an intensity level, and any other controllable property. In various embodiments, the controllable network device is included in devices 102 of FIG. 1A or devices 126 of FIG. 1B.

The list of candidate configuration settings for the property may be preconfigured. For example, a subset from all possible configuration settings for the property has been selected to be included in the list. In some embodiments, the list of candidate configuration settings for the property to be iterated is dynamically determined. For example, candidate configuration setting values are bounded by one or more limits that dynamically vary based on one or more variables. For example, the maximum intensity output of a light bulb is limited based on a time of day (e.g., bulb is allowed to output the entire range of intensities during daylight hours but is bounded to only output 50% of maximum intensity during night hours) and the list of candidate configuration settings only includes intensity values within the time-based limit.

At 604, for each applicable input state, an optimization evaluation value for the selected candidate configuration setting is determined. For example, for each applicable input state of input states received in 502 of FIG. 5 to automatically control the property of the controllable networked device, the optimization evaluation value for the selected candidate configuration setting is determined. In some embodiments, there exists a data structure that stores for each different pair of input state and candidate output (e.g., a particular configuration setting), a corresponding optimization evaluation value that quantifies the relationship between the input state and the candidate output. For example, the optimization evaluation value identifies the magnitude of the desirability of the selected candidate configuration setting for a particular input state. In one example, the optimization evaluation value is a cost value to be evaluated using a cost function. In some embodiments, the optimization evaluation value is at least in part calculated using a formula. In some embodiments, the optimization value has been automatically determined. For example, the optimization value has been determined using machine learning based on detected data and user feedback. In some embodiments, the optimization evaluation value has been at least in part predefined. For example, a user and/or programmer has specified the optimization evaluation value.

In some embodiments, determining the optimization evaluation value for an input state includes utilizing one or more parameters to dynamically determine the optimization evaluation value. For example, rather than using a predetermined static value, the optimization evaluation value may vary according to one or more other variables that are inputs to the parameters. In some embodiments, an optimization evaluation value decays over time from a time of a specified event according to a decay function parameterized by a parameter that utilizes a time value as an input. For example, a light intensity of a light bulb is to decay gradually after a light switch has been manually turned on and the optimization evaluation value associated with a full brightness light intensity setting decays according to a parameter decay function that utilizes as its input a time since a switch was turned on. In some embodiments, an optimization evaluation value varies according to a parameter based on a number of users detected in an environment (e.g., optimization evaluation value for a particular switch state and a candidate light level configuration setting is based on the number of users in a room).

In some embodiments, the one or more input states and/or parameters are based on one or more previous outputs or configuration settings. For example, it is not desirable to rapidly change configuration settings within a short period of time (e.g., might damage a motor, light bulb, etc.) and multiple changes to different configuration settings in a short period of time are discouraged by taking into consideration previous configuration setting changes when determining the optimization evaluation value (e.g., add an adjustment factor to a base optimization evaluation value when many configuration changes have been implemented for the same property of the controllable device within a short period of time).

At 606, the determined optimization evaluation values for the selected candidate configuration setting are combined to determine an output candidate optimization evaluation value for the selected potential configuration setting. For example, the determined optimization evaluation values for the selected candidate configuration setting are summed together. In some embodiments, determining the output candidate optimization evaluation value includes determining a weighted sum of one or more of the determined component optimization evaluation values. In some embodiments, determining the output candidate optimization evaluation value includes determining an average of one or more of the determined component optimization evaluation values.

In some embodiments, determining the output candidate optimization evaluation value includes determining a weighted value of an optimization evaluation value of an input state that is a candidate state. For example, because the exact correct current state may be difficult to determine with complete accuracy, one or more of the received input states are associated with one or more weight factors (e.g., percentage value) representing a determined likelihood that the candidate input state is the actual input state. This may allow different candidate input states for the same actual input state to be received and evaluated independently then weighted and combined together (e.g., weighted average) based on the weight factors. For example, a received input indicates that there is a 70% likelihood that a user is in a sitting state and a 30% likelihood that the user is in a standing state. Prior to being summed with other optimization evaluation values, the determined optimization evaluation value for the sitting state is multiplied by 0.7 and the determined optimization value for the standing state is multiplied by 0.3.

At 608 it is determined whether there exists an additional candidate configuration setting of the property of the controllable networked device to be selected for evaluation. For example, it is determined whether there exists a next candidate configuration setting to be evaluated from a list of candidate configuration settings to be evaluated. If at 608 it is determined that there exists an additional candidate configuration setting to be selected for evaluation, the process returns to 602.

If at 608 it is determined that there does not exist an additional candidate configuration setting to be selected for evaluation, at 610, an optimization function is utilized to select a selected candidate configuration setting to be outputted.

In some embodiments, the optimization function to be utilized is predetermined. In some embodiments, the optimization function to be utilized is selected among a plurality of optimization functions based on one or more factors (e.g., property to be controlled, input states, user preference, etc.). In some embodiments, utilizing the optimization function includes comparing the output candidate optimization evaluation value for each of the candidate configuration settings using the optimization function to select the most optimal output candidate optimization evaluation value. For example, the optimization function is a cost optimization function and each of the determined output candidate optimization evaluation values represents cost values, and the selected candidate configuration setting is the candidate configuration setting with the lowest cost value. Other examples of the optimization function include a maximization function, a risk function, a value function, a probability function, and a decision function, among others. In some embodiments, the optimization function specifies that the candidate configuration setting with the largest output candidate optimization evaluation value is to be selected. In some embodiments, the optimization function specifies that the candidate configuration setting with a local minimum/maximum output candidate optimization evaluation value is to be selected. In various embodiments, utilizing the optimization function includes identifying a statistically relevant value among the determined output candidate optimization evaluation values using a criteria defined by the optimization function and identifying the corresponding selected candidate configuration setting as the setting to be implemented on the controllable device.

In some embodiments, the selected potential configuration setting is provided to the controllable device in 506 of FIG. 5 and the process returns to 508 of FIG. 5. In some embodiments, the selected candidate configuration setting is provided to the controllable device only if the selected candidate configuration setting indicates a different configuration setting than a current configuration setting of the controllable device property being automatically controlled.

In one illustrative example of the process of FIG. 6, in order to determine a speed of a bathroom exhaust fan, the candidate configuration settings include a high speed setting, a low speed setting, and an off speed setting that are each evaluated separately. The received input state indicates that the humidity level is high, motion has been detected in the bathroom, and a user selected scene mode is sleeping mode. When the high speed candidate setting is evaluated, an optimization evaluation value of 1 is determined for the high humidity level input state, an optimization evaluation value of 7 is determined for the bathroom motion detection input state, and an optimization evaluation value of 10 is determined for the bathroom sleeping scene mode. When the low speed candidate setting is evaluated on the next iteration, an optimization evaluation value of 3 is determined for the high humidity level input state, an optimization evaluation value of 3 is determined for the bathroom motion detection input state, and an optimization evaluation value of 4 is determined for the bathroom sleeping scene mode. When the off speed candidate setting is evaluated on the next iteration, an optimization evaluation value of 18 is determined for the high humidity level input state, an optimization evaluation value of 1 is determined for the bathroom motion detection input state, and an optimization evaluation value of 1 is determined for the bathroom sleeping scene mode. Then the optimization evaluation values are summed together for each candidate setting, resulting in an output candidate optimization evaluation value of 18 for the high speed candidate setting, an output candidate optimization evaluation value of 10 for the low speed candidate setting, and an output candidate optimization evaluation value of 20 for the off speed candidate setting. A cost optimization function to be utilized specifies that the configuration setting candidate with the lowest optimization evaluation value is to be selected and the low speed setting is selected as the selected configuration setting to be implemented because it had the lowest output candidate optimization evaluation value.

Figure 7:
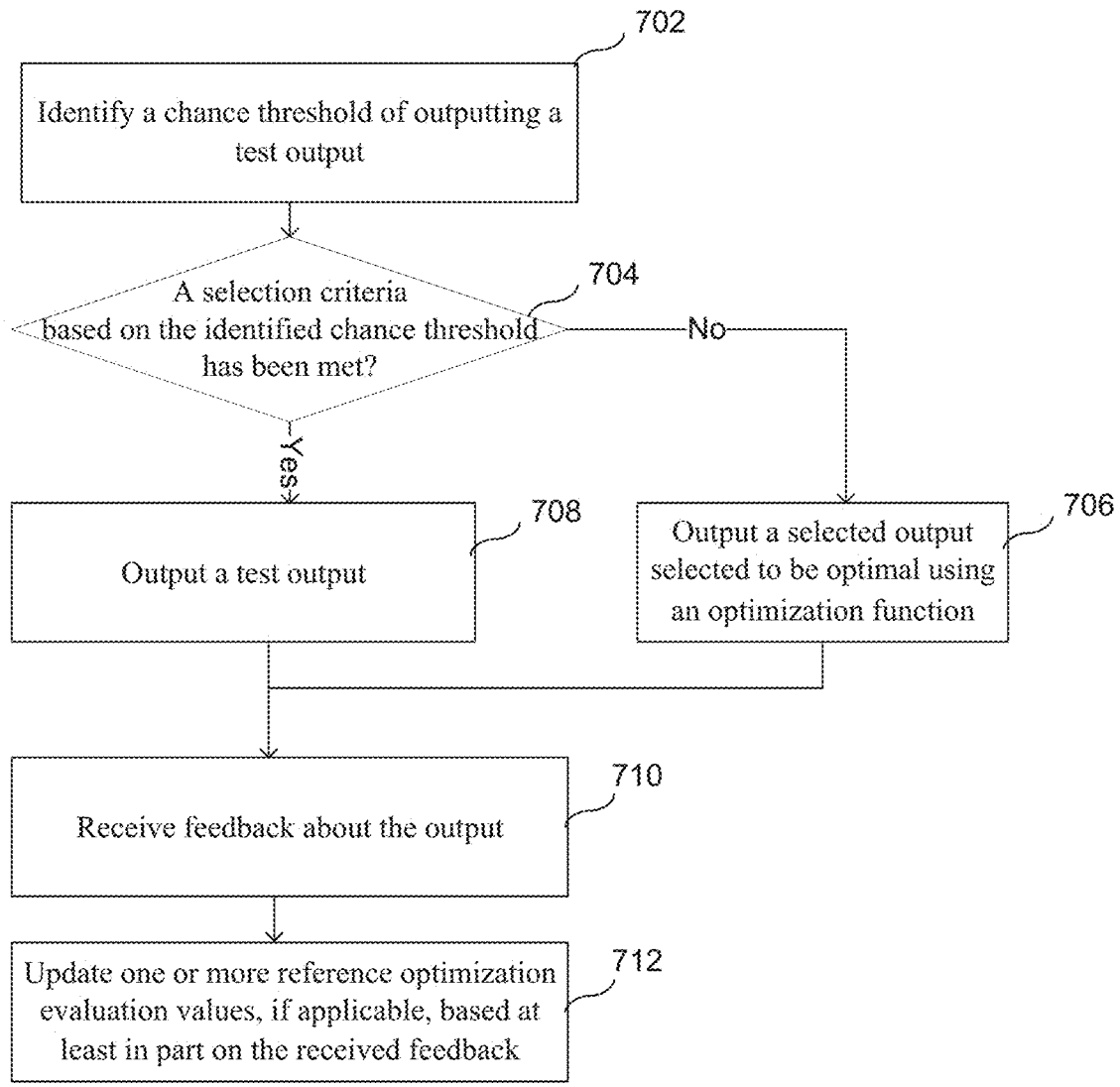
FIG. 7 is a flowchart illustrating an embodiment of a process for attempting to discover an improved output.

FIG. 7 is a flowchart illustrating an embodiment of a process for attempting to discover an improved output. The process of FIG. 7 may be at least in part implemented on hub 104 and/or server 106 of FIG. 1A. In some embodiments, at least a portion of the process of FIG. 7 is included in 208 of FIG. 2. In some embodiments, at least a portion of the process of FIG. 7 is included in 506 of FIG. 5. In some embodiments, at least a portion of the process of FIG. 7 is included in 610 of FIG. 6. In some embodiments, at least a portion of the process of FIG. 7 is repeated each time an output to control a controllable device is to be automatically determined.

At 702, a chance threshold of outputting a test output is identified. For example, when utilizing an optimization function to select the most optimal output (e.g., using the process of FIGS. 5 and/or 6), the selected output is selected based on determined candidate optimization evaluation values of the output candidates. However, if the candidate optimization evaluation values do not accurately capture the desirability of an output candidate, the selected output candidate may be suboptimal. Although the optimization evaluation values mapping to results and inputs may be adjusted and improved based on feedback (e.g., user manually changes the suboptimal setting to the optimal setting and machine learning is utilized to learn from this change), the user may not provide valuable feedback to improve output results if the output is satisfactory despite being not optimal. For example, although the optimal fan speed setting is low speed, a user may not provide feedback to indicate this optimal speed if a current different fan setting (e.g., high speed) is satisfactory.

In some embodiments, in an attempt to discover a more optimal output (e.g., output configuration setting of a controllable device), an output that may not be the most optimal according to an optimization is provided as the output in limited instances to discover potentially more optimal outputs. For example, rather than using the most optimal output selected by an optimization function, a random output and/or second most optimal output is provided as the output to discover whether this output is potentially a more optimal output. In some embodiments, the chance threshold identifies the target probability that an output that was not selected as the most optimal output is to be provided as the output. In some embodiments, the chance threshold is dynamically determined. For example, by dynamically varying the chance threshold, a beta tester could be exposed to more test outputs that may not be most optimal while a commercial user that desires reliability is exposed to relatively less test outputs that may not be most optimal. In another example, rather than continually exposing a user to successive test outputs that may not be most optimal, the number of test outputs provided within a time interval is limited by varying the learning selection chance threshold.

In some embodiments, identifying the chance threshold includes dynamically selecting the chance threshold value based at least in part on one or more of the following: one or more input states (e.g., received in 502 of FIG. 5), a time since a last test output, a profile of a user, a correctness result/feedback of the last test output, a current time/date, and a type of property and/or controllable device to be controlled, etc.

At 704, it is determined whether a selection criteria based on the identified chance threshold has been met. For example, it is determined whether a test output that is not an optimization function selected output should be outputted based on a randomized selection criteria evaluated using the chance threshold. In some embodiments, in order to determine whether a test output is to be provided, a random value is selected and it is determined whether the random value is within a range bounded by a limit of the chance threshold. (e.g., if the random value is less than the chance threshold value, the chance threshold is met or otherwise it is not met).

If at 704 it is determined that the selection criteria has not been met, at 706 a selected output selected to be optimal using an optimization function is outputted. For example, an output selected by an optimization function to be optimal (e.g., in 506 of FIG. 5, 610 of FIG. 6, etc.) is provided as an output to control a controllable device.

If at 704 it is determined that the selection criteria has been met, at 708 a test output is outputted. For example, among potential output candidates (e.g., candidate configuration setting of a property of a controllable device to be controlled) that have been identified (e.g., identified in 602 of FIG. 6), one of the output candidates is randomly selected and outputted. The output candidates that are eligible to be randomly selected to be outputted may be limited based on an analysis performed using an optimization function. For example, only the top 50% of output candidates as ranked by the optimization function are eligible to be selected for output as the test output. In another example, a second most optimal output as determined based on the optimization function is provided as the test output.

At 710, feedback about the output is received. For example, in the event the output resulted in an undesirable configuration setting of the property of the controllable device, a user may specifically override the configuration setting by explicitly changing the configuration setting (e.g., adjust control switch of the device). In some embodiments, a user may confirm via a user indication whether the output configuration setting is a desired configuration setting. For example, using a user device, a user may specify whether a recent output resulted in an automation behavior desired by the user (e.g., optimization component value(s) modified based on indication). In some embodiments, a lack of an action by a user is a confirmation feedback that the output was not undesirable. For example, a relationship between an input state and the output is assumed to be more acceptable by a user the longer and/or more often the user has not provided feedback or modified the configuration setting given the same input state.

At 712, one or more reference optimization evaluation values are updated, if applicable, based at least in part on the received feedback. For example, one or more reference values (e.g., values to be referenced for future evaluations) identifying an association between an input state and a particular output (e.g., configuration setting of the controllable device) are updated using the received feedback. For example, a positive indication from a user that the output was desired reduces an associated optimization evaluation value and a negative indication from the user that the output was not desired increases the associated optimization evaluation value.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automatically controlling a network connected controllable device, including:
 a processor configured to:
  receive a plurality of inputs that indicate states of a network connected device environment associated with a property of the network connected controllable device to be automatically controlled, wherein the plurality of inputs includes image data that is analyzed using machine learning to determine an activity state of a subject;
  evaluate a plurality of output candidates according to an optimization function, wherein the optimization function depends on the plurality of inputs, the determined activity state of the subject, and one or more parameters, and the output candidates are associated with candidate settings of the property of the network connected controllable device to be automatically controlled;

select among the plurality of output candidates a selected output that optimizes the optimization function, wherein selecting the selected output includes determining whether to provide a test output instead of an optimal output identified using the optimization function; and implement the selected output including by automatically causing actuation of the network connected controllable device that is an appliance in the network connected device environment to a physical device state corresponding to the selected output, wherein at least one of the indicated states of the received inputs used in evaluating the plurality of output candidates to select the selected output is a candidate state associated with a confidence probability; and a memory coupled with the processor, wherein the memory is configured to provide the processor with instructions.

2. The system of claim 1, wherein receiving the plurality of inputs includes selecting the plurality of inputs as inputs utilized in automatically controlling the property of the network connected controllable device.

3. The system of claim 1, wherein evaluating the plurality of output candidates includes determining an output candidate optimization evaluation value for each of the plurality of output candidates.

4. The system of claim 3, wherein determining the output candidate optimization evaluation value for each of the plurality of output candidates includes determining for each output candidate a state optimization evaluation value for each of the received inputs.

5. The system of claim 4, wherein determining the output candidate optimization evaluation value for each of the plurality of output candidates includes determining for each output candidate a sum of the state optimization evaluation values.

6. The system of claim 4, wherein at least one of the state optimization evaluation values is determined using machine learning.

7. The system of claim 3, wherein determining the output candidate optimization evaluation value includes using at least one of the parameters to dynamically determine based on a variable input to the at least one parameter, a component optimization evaluation value.

8. The system of claim 1, wherein evaluating the plurality of output candidates includes evaluating the plurality of output candidates based at least in part on one or more previously selected outputs.

9. The system of claim 1, wherein evaluating the plurality of output candidates includes evaluating the plurality of output candidates based at least in part on a number of times a controllable setting of the property has changed within a time period.

10. The system of claim 1, wherein selecting among the plurality of output candidates the selected output that optimizes the optimization function includes comparing evaluation optimization values corresponding to the plurality of output candidates for the same controllable device, wherein each of the evaluation optimization values quantifies a relationship between the states of the network connected device environment and the corresponding output candidate in the plurality of output candidates for the same controllable device.

11. The system of claim 1, wherein evaluating the plurality of output candidates includes using the confidence probability to determine a weighted average of optimization evaluation values.

12. The system of claim 1, wherein the candidate settings associated with the plurality of output candidates are a subset of configuration settings of the property.

13. The system of claim 1, wherein the optimization function is utilized to resolve a conflict between conflicting automation rules that specify conflicting physical device states of the appliance in the network connected device environment.

14. The system of claim 1, wherein selecting the selected output includes using the optimization function to compare the evaluations of the output candidates.

15. The system of claim 1, wherein the optimization function is a cost function and selecting the selected output includes using the optimization function to determine that the selected output is associated with a minimal cost value.

16. The system of claim 1, wherein selecting the selected output includes determining whether a selection criteria based on a test chance threshold has been met and the test chance threshold identifies a probability that the test output will be outputted.

17. The system of claim 1, wherein the network connected controllable device is an exhaust fan and the property of the network connected controllable device is a fan operation.

18. The system of claim 1, wherein the network connected controllable device is one or more of the following: a switch, a door lock, a thermostat, a light bulb, a kitchen/home appliance, a camera, a speaker, a garage door opener, a window treatment, a fan, an electrical outlet, an audio/visual device, a light dimmer, an irrigation system and a pet feeder.

19. The system of claim 1, wherein the processor is further configured to receive a user feedback regarding the selected output and update an evaluation value of the optimization function based at least in part on the user feedback.

20. The system of claim 1, wherein the output setting specifies that a current setting of the property of the network connected controllable device is to be maintained.

21. A method for automatically controlling a network connected controllable device, including:

receiving a plurality of inputs that indicate states of a network connected device environment associated with a property of the network connected controllable device to be automatically controlled, wherein the plurality of inputs includes image data that is analyzed using machine learning to determine an activity state of a subject;

using a processor to evaluate a plurality of output candidates according to an optimization function, wherein the optimization function depends on the plurality of inputs, the determined activity state of the subject, and one or more parameters, and the output candidates are associated with candidate settings of the property of the network connected controllable device to be automatically controlled; and selecting among the plurality of output candidates a selected output that optimizes the optimization function, wherein selecting the selected output includes determining whether to provide a test output instead of an optimal output identified using the optimization function; and implementing the selected output including by automatically causing actuation of the network connected controllable device that is an appliance in the network connected device environment to a physical device state corresponding to the selected output, wherein at least one of the indicated states of the received inputs used in evaluating the plurality of output candidates to select the selected output is a candidate state associated with a confidence probability.

22. A computer program product for automatically controlling a network connected controllable device, the computer program product being embodied in a non-transitory computer readable storage medium and comprising computer instructions for:

receiving a plurality of inputs that indicate states of a network connected device environment associated with a property of the network connected controllable device to be automatically controlled, wherein the plurality of inputs includes image data that is analyzed using machine learning to determine an activity state of a subject;

evaluating a plurality of output candidates according to an optimization function, wherein the optimization function depends on the plurality of inputs, the determined activity state of the subject, and one or more parameters, and the output candidates are associated with candidate settings of the property of the network connected controllable device to be automatically controlled; and selecting among the plurality of output candidates a selected output that optimizes the optimization function, wherein selecting the selected output includes determining whether to provide a test output instead of an optimal output identified using the optimization function; and implementing the selected output including by automatically causing actuation of the network connected controllable device that is an appliance in the network connected device environment to a physical device state corresponding to the selected output, wherein at least one of the indicated states of the received inputs used in evaluating the plurality of output candidates to select the selected output is a candidate state associated with a confidence probability.

23. The method of claim 21, wherein the network connected controllable device is one or more of the following: a switch, a door lock, a thermostat, a light bulb, a kitchen/home appliance, a camera, a speaker, a garage door opener, a window treatment, a fan, an electrical outlet, an audio/visual device, a light dimmer, an irrigation system and a pet feeder.

* * * * *